United States Patent [19]

Schiller

[11] 3,868,637

[45] Feb. 25, 1975

[54] DOCUMENT RETRIEVAL SYSTEM

[76] Inventor: Michael S. Schiller, 4585 Fieldston Rd., Riverdale, N.Y. 10005

[22] Filed: Sept. 19, 1973

[21] Appl. No.: 398,855

Related U.S. Application Data

[62] Division of Ser. No. 185,066, Sept. 30, 1971.

[52] U.S. Cl....... 340/146.3 F, 178/7.6, 340/146.3 P, 350/162 SF, 350/271, 353/26

[51] Int. Cl. .............................................. G06k 9/13

[58] Field of Search............... 340/146.3 P, 146.3 F; 350/110, 161, 162 R, 162 SF, 162 ZP, 271; 353/25, 26, 27

[56] References Cited

UNITED STATES PATENTS

| | | | |
|---|---|---|---|
| 3,210,468 | 10/1965 | Trott | 178/DIG. 2 |
| 3,803,353 | 4/1974 | Sanderson et al. | 178/7.7 |

*Primary Examiner*—Gareth D. Shaw
*Assistant Examiner*—Leo H. Boudreau
*Attorney, Agent, or Firm*—Ryder, McAulay, Fields, Fisher & Goldstein

[57] ABSTRACT

An automatic retrieval system for locating desired frames of microfilm wherein each frame may be randomly located along a strip of microfilm. The coding employed is the use of humanly readable symbols, such as alpha-numeric characters, deployed along the margin of each side of each frame. The symbols are transparent against an opaque background and are small enough so that they will significantly diffract light. First and second rectangular beams of laser light scan first and second margins to provide a Fraunhofer diffraction pattern for each symbol. The Fraunhofer diffraction pattern is projected onto an array of photocells to provide a unique set of signals to indicate each symbol. Thus, each symbol is a byte, rather than a bit. A unique center symbol is used. A rectangular beam is developed from a circular laser generator output by compression in one direction through two cylindrical lenses to provide an elliptical beam. The elliptical beam impinges on a plate having a central slit to form a rectangular beam. The light on the slit is further processed and transmitted onto the film margin. A beam splitter splits the transmitted light into two beams, one for each margin on the film. The center symbols on opposite margins are orthogonally read to provide output signals which are nominally displaced 90° from one another so that direction of movement of film can be sensed and controlled. The code along each margin is replicated to improve signal to noise, reduce ambiguity and reduce erroneous readings.

8 Claims, 11 Drawing Figures

DOCUMENT RETRIEVAL SYSTEM

This is a division of application Ser. No. 185,066, filed Sept. 30, 1971, now abandoned.

DOCUMENT RETRIEVAL SYSTEM

This invention relates in general to a document retrieval system and more particularly to one that enables automatic, fast retrieval of a particular frame from a reel of microfilm through the punching in on a keyboard of information concerning the document photographed on the microfilm frame.

BACKGROUND OF THE INVENTION

Document retrieval systems of many different types exist. There are known techniques for locating a particular frame or frames that are on a reel of microfilm so as to reproduce desired documents therefrom. Many of these techniques require that the documents be placed on the microfilm in a particular order, such as numerical or alphabetical order, and the location technique takes into account the ordering involved. There are obvious limitations to such an ordering requirement, and it is an important purpose of this invention to provide a document retrieval technique for use with microfilm that does not require that the documents be placed on the microfilm in any particular order or sequence.

It is, of course, possible to visually scan through each frame of microfilm by having it projected onto a viewer in order to locate a desired document. However, such techniques are much too time consuming. Accordingly, it is an important purpose of this invention to provide an automatic retrieval technique that also meets the requirement that the documents can be placed on a reel of microfilm in random sequence.

There are various coding techniques that are employed to effect automatic document retrieval off a reel of microfilm. The known techniques either provide too little coded information to be valuable for most purposes, or require that the amount of coding be very extensive so that complex and expensive equipment is involved, the scan time is greater than desired and too much of the microfilm is taken up by the coding.

Accordingly, another important purpose of this invention is to provide an automatic retrieval system for the retrieval of documents that are randomly set down on a roll of film which system is sufficiently inexpensive, sufficiently fast in operation, and sufficiently efficient in the use of the microfilm so that the system can be employed in a wide variety of circumstances and for a wide variety of uses.

It is a further purpose of this invention to provide all the above purposes in a context that provides a low error rate and a low enough cost so that the system involved will be commercially usable and economically justifiable.

It is a specific purpose of this invention to provide a technique for coding each frame of microfilm with a dense code in the sense that a large amount of information is supplied for the amount of microfilm area taken up by the code block.

In order to keep the following disclosure from becoming too detailed, many known optical relationships are only briefly discussed. A more comprehensive discussion can be found in the text: *Introduction To Fourier Optics* by Joseph W. Goodman, McGraw-Hill Book Co., New York, N.Y., copyright 1968, Library of Congress Catalog Card No. 68–17184.

BRIEF DESCRIPTION OF THE INVENTION

In brief, this invention employs a humanly readable code structure and, in particular, alpha-numerical symbols deployed along both margins of a reel of microfilm. The symbols are very small in size so that 10 to 20 can be deployed along each margin of each frame of microfilm. The symbols thus can be used to identify each frame by a name or number, or both. If the frame of information contains a document on an individual, the alphabetical code in the margins of each frame can be used to spell out the individual's name. In this fashion, each symbol is a byte rather than a bit. Thus a very dense arrangement of coding information is provided.

The code is read automatically. A first rectangular shaped laser beam scans one of the film margins and a second rectangular laser beam scans the other film margin. The code symbols are so small in size that the laser beams are diffracted and thus a Fraunhofer diffraction pattern, unique to each symbol, is generated. This Fraunhofer diffraction pattern is projected on an array of photocells to provide a pattern of electrical signals that uniquely identifies each symbol.

A rectangular center symbol is used along each margin to indicate the center of the frame. The two reading beams are displaced longitudinally from one another by an amount that provides an orthogonal relationship between the signals generated by the center symbols so that these signals can be read as leading and lagging one another and thereby provide an indication of direction of movement of film. This indication, in turn, permits control over the movement of the film and, in particular, return to the center of a frame after it has been scanned and identified as one of the commanded frames.

A comparison of the relative levels of the outputs of paired photocells provides a set of signals that uniquely identify each symbol and thus permit automatic machine reading of the symbol scanned.

The coding symbols are replicated (in triplicate in one embodiment) to provide improved signal to noise ratio at the photocells and to reduce the effect of accidental obscuring or distortion of any one symbol.

The reading beams are shaped to be rectangular. A laser generator circular output of, for example, 40 mils (0.040 inches) TEM.. is compressed along one transverse axis by two cylindrical lenses to form an elliptical collimated beam of 40 mils by 3.3 mils. At the optical downstream focal plane of the second cylindrical lens, a rectangular slit of 30 mils by 2.2 mils diffracts the collimated elliptical laser beam. A first converging lens processes and transmits the diffraction pattern of the slit to provide a Fraunhofer diffraction pattern at the downstream focal plane of the first converging lens. A second downstream converging lens whose upstream focal plane is coincident with the downstream focal plane of said first converging lens performs a further Fourier transformation on that Fraunhofer diffraction pattern and thus optically recreates the slit at the downstream focal plane of the second converging lens, at which plane the film is located. A beam splitter between the second converging lens and the film provides two optically created slits, or reading windows, one for each margin of the film.

BRIEF DESCRIPTION OF THE DRAWINGS

Other objects and purposes of this invention will become apparent from the following detailed description and drawings in which:

FIG. 9 shows the rectangular center code symbols on both margins, the coding on both margins and the use of frame start and frame end symbols.

DESCRIPTION OF THE PREFERRED EMBODIMENTS

Figure 1:
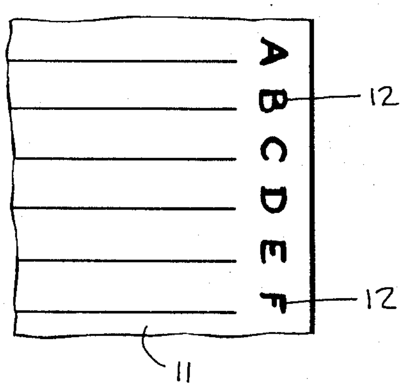
FIG. 1 is a blown-up representation of a portion of a frame of film showing one embodiment of the readable character code in the margin.

The following Document Retrieval System is particularly adapted to be employed to locate (for viewing or reproduction) a particular line or frame of information that has been photographed on a roll (cartridge or cassette) of microfilm.

The functions of this Retrieval System are obtained because of a very efficient (in terms of the use of space on the microfilm) coding technique. Accordingly, it is of major importance to understand the coding technique of this Retrieval System.

The coding technique can best be understood by reference to a particular applicator. Assume that the application is to bank account verification. Assume that the document to be retained on microfilm for viewing, in order to effect account verification, is one that has been specially prepared for this purpose. Assume, the document itself, before being microfilmed, is 1 inch in height. This 1 inch height has, from experience, been found to be the minimum height necessary to accommodate an individual signature. Assume further, that within this 1 inch high document there is typed the name of the depositor, his home address, his mother's maiden name, his mother's place of birth, and his account number. Obviously other information, such as credit verification can be included.

When a depositor presents himself at any branch of the bank involved, he may be asked to identify himself either by name and/or by account number. It is then desired that the bank teller be able to interrogate the document Retrieval System and have the appropriate account verification document located. The located document is then projected for viewing by the teller so that the depositor's signature can be verified and the depositor in turn can be asked to identify himself by address, mother's maiden name and mother's place of birth in order to verify that the individual presenting himself is who he represents himself to be. With this background in mind, the following application of the coding technique can be more readily understood.

THE CODE

A 33 to 1 reduction is employed in placing the document onto microfilm. Assume that the documents are photographed on the film in the fashion known as cine mode writing. This means that the horizontal line or lines of the document run across the width of the film. Since a 33 to 1 reduction is employed, each document appears on the film within a span of film height of 1/33rd of an inch. Within this 1/33rd of an inch of film, this Retrieval System places, for example, ten alpha-numeric characters in a vertical line along each margin of the film. Thus, ten alpha-numeric characters, in one embodiment, are laid out in a vertical line along the margin to the right of the frame of information. (It might be noted that in this embodiment, it is the 1 inch document which becomes the 1/33rd of an inch frame of information.) Another ten alpha-numeric characters are laid out in a vertical line in the margin to the left of the information on the document. With twenty characters (not just bits, but full characters) available to identify a single document, it becomes possible to provide identification of this type of document by name and account number.

It might be noted that the characters placed on the film margin are themselves alpha-numeric characters and are not bits. Therefore, each character is a "byte" (and not a bit) so that a great deal more dense packing of identification information is available than if a bit code identification were employed.

These alpha-numeric characters are laid out in the margin of the film 11 as illustrated in FIG. 1. FIG. 1 represents a very much expanded, partial view of a frame. (Each frame being in fact 1/33rd of an inch in height). The spatial duty cycle of the characters is 50 percent. In the embodiment shown, these coding characters 12 are turned 90° from the characters of the document within the frame itself. It follows in such an embodiment that the width of each character is one-half (there being a 50 percent spatial duty cycle) of one-tenth (there being ten characters in a row) of 1/33rd of an inch (the height of the frame). This is a character width of approximately 1.5 mils (0.0015 inches). The coding character 12 height is approximately 2 mils.

AVOIDANCE OF 180° SYMMETRY

It is possible for the actual characters placed on the margin of the film to be of any arbitrary sort providing they each give a unique Fraunhofer diffraction pattern. In order to make sure that these symbols do provide a unique fourier diffraction pattern, it is necessary that no two symbols have 180° symmetry relative to one another. For example, in certain scripts, pairs such as (a)

a six and a nine, (b) a two and a five, and (c) even an E and a three have 180° symmetry. Such symbols should be avoided. They can easily be avoided in this system because the characters placed on the microfilm can be completely arbitrary, as far as recognizability to the human reader is concerned. Where recognizable code characters are desired, the font can be designed to avoid 180° symmetry.

Figures 8, 9, 10:
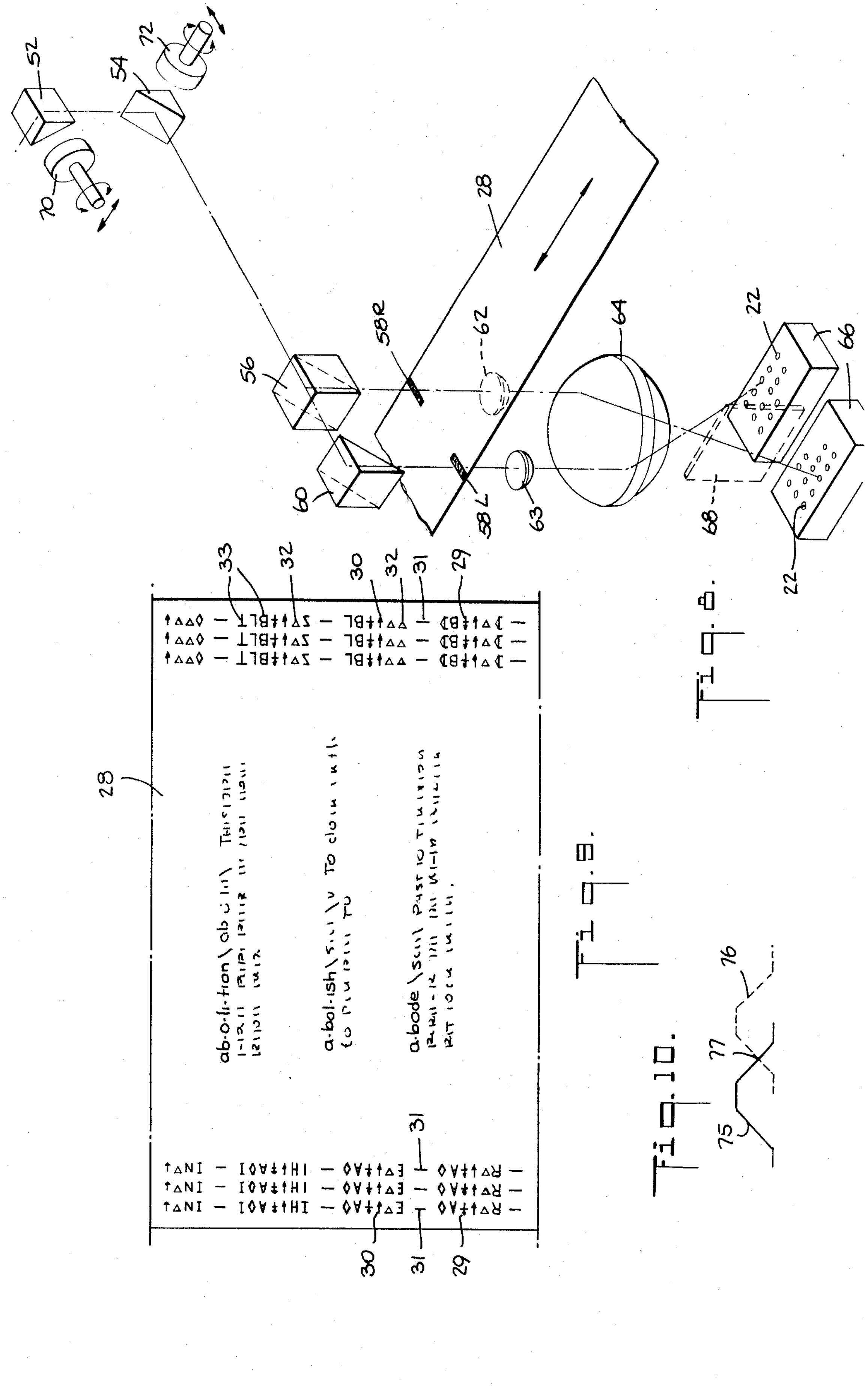
FIG. 8 is an optical schematic of a preferred embodiment showing the simultaneous reading of characters in both the right and lefthand margin of the film. The FIG. 8 arrangement is employed to provide an indication of the direction of movement of the film.
FIG. 9 is a blown-up representation of a portion of three frames of film employed in the FIG. 8 preferred embodiment.
FIG. 10 is a representation of the two electrical signals derived from corresponding left and right center symbols and used to position each frame for projection and viewing.

As shown in FIG. 10, an arrow symbol pointing to the left is employed to indicate the start of a frame and an arrow symbol pointing to the right indicates the end of a frame. Such a use of arrows poses the problem of 180° symmetry. Thus, as shown in FIG. 10, the arrow pointing to the left has an additional vertical line across the stem. This assures that the fourier diffraction pattern for the two arrows will be distinctly different.

INTERROGATING THE CODE

Figure 2:
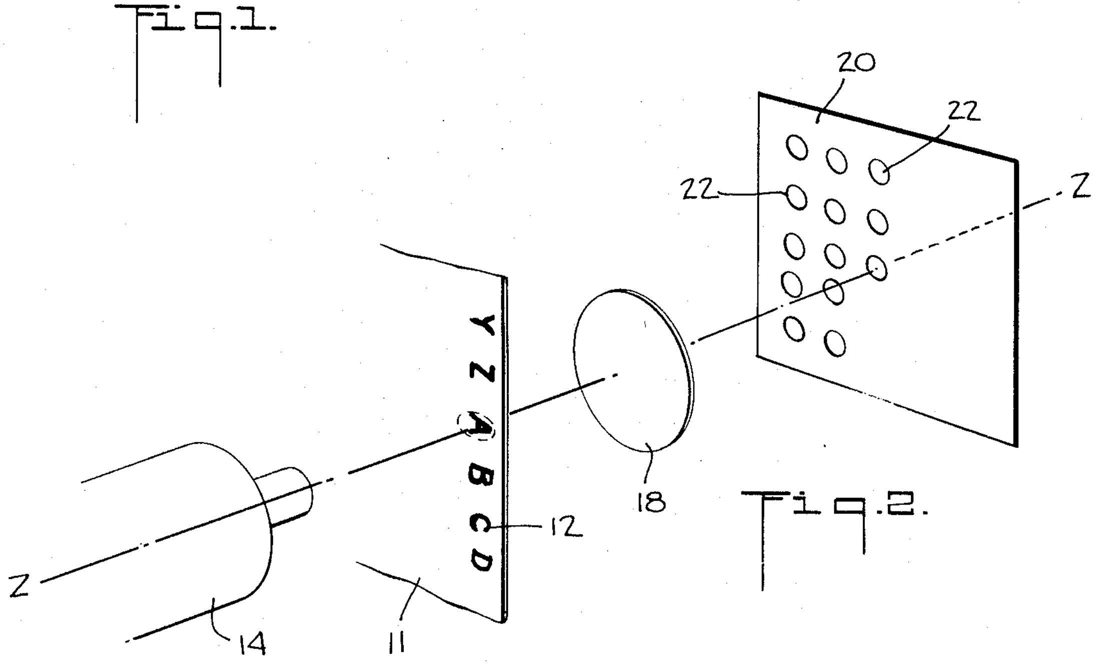
FIG. 2 is a simplified optical schematic of a first embodiment of this invention.

FIG. 2 schematically shows the arrangement of a simplified reading head. On one side of the film 11 margin in which the alpha-numeric identifying characters 12 appear is a source 14 for a laser beam of light having the optical axis Z—Z. The laser beam has dimensions sufficiently great to encompass the entire area of any one of the alpha-numeric characters 12. The alpha-numeric characters 12 are spaced far enough from one another so that the beam can view one character without including any portion of adjacent characters. The alpha-numeric characters 12 are presented in the margin as transparent characters on an opaque background. The edges of the characters cause the laser beam to be diffracted. As is known, the diffracted laser beam can be viewed at infinity (or at a sufficiently large distance) on a screen and will provide on that screen a Fraunhofer diffraction pattern. The alpha-numeric system employed in this Retrieval System is designed and selected such that each character has a unique and identifiable fourier pattern.

In this Retrieval System, a spherical converging lens 18 is placed between the characters 12 and the screen 20. It is important that the screen 20 be positioned at the back (optically downstream) focal plane of the lens 18. This lens 18 serves two important functions. One function of this lens 18 is to reduce the distance required to form the Fraunhofer diffraction pattern. A second and very important function of this lens 18 is to stabilize the position of the diffraction pattern on the screen 20. The reasons for this stabilization is indicated below.

The screen 20 is composed of an array of photocells 22. If the alpha-numeric characters and other symbols 12 are properly designed, each Fraunhofer diffraction pattern will be sufficiently distinct so that the pattern of photocell 22 responses can be used to uniquely identify each character 12. It is important to note that since the alpha-numeric code employed is not read by the human eye, it is not essential that the characters have the usual configurations of the English alphabet and the Arabic numerals. The keyboard for imprinting the characters may have the regular humanly recognizable alpha-numeric characters, but the actual configuration imprinted on the microfilm margin can be completely unique and must be designed to have whatever spatial configurations will provide a unique set of Fraunhofer diffraction patterns.

Stabilization occurs because of the position of the array of photocells 22 at the downstream (back) focal plane of the lens 18. As a consequence, all rays incident on the lens 18 with a given angle of incidence are focused at the same point on the screen 20 (i.e., on the array of photocells 22). Diffraction of the laser beam light by the symbols 12 involves imposing angular deviations on part of the collimated light. As long as the character 12 being read is entirely within the beam, displacement of that character within the beam will not affect the diffraction of the beam and thus will not affect the angle of the rays incident on the lens 18. Accordingly, the diffraction pattern imaged by the lens 18 on the screen 20 will be unchanged in position by character displacement within the beam. In this fashion, spatial stabilization of the Fraunhofer diffraction pattern is provided. Thus, the photocell 22 output pattern can be read at any time while the character 12 being read is wholly within the beam.

READING THE FOURIER DIFFRACTION PATTERN

In one embodiment, no more than nine photocells 22 are employed to constitute the array 20.

Figure 3:
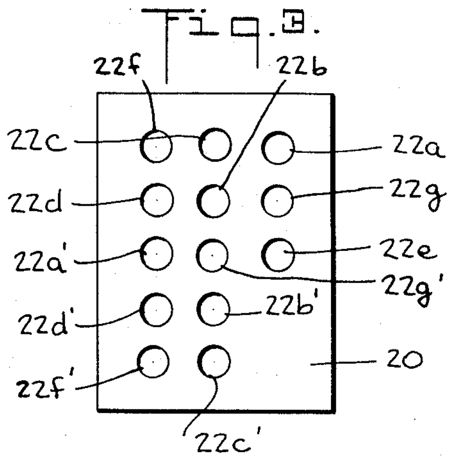
FIG. 3 is a representation of the surface of the plane on which the Fraunhofer diffraction pattern generated by the FIG. 2 embodiment is formed showing the deployment of the photocells thereon.

FIG. 3 illustrates the deployment of the nine photocells. The center photocell 22$e$ is positioned along the optical axis X—X of the light beam 16. The eight other photocells are arranged in pairs. The members of each pair are at the same raidal distance from the center photocell. These eight photocells each provide an output signal which represents the intensity of light of the imaged fourier diffraction pattern at that point in the plane.

Figures 4, 5, 5A, 7:
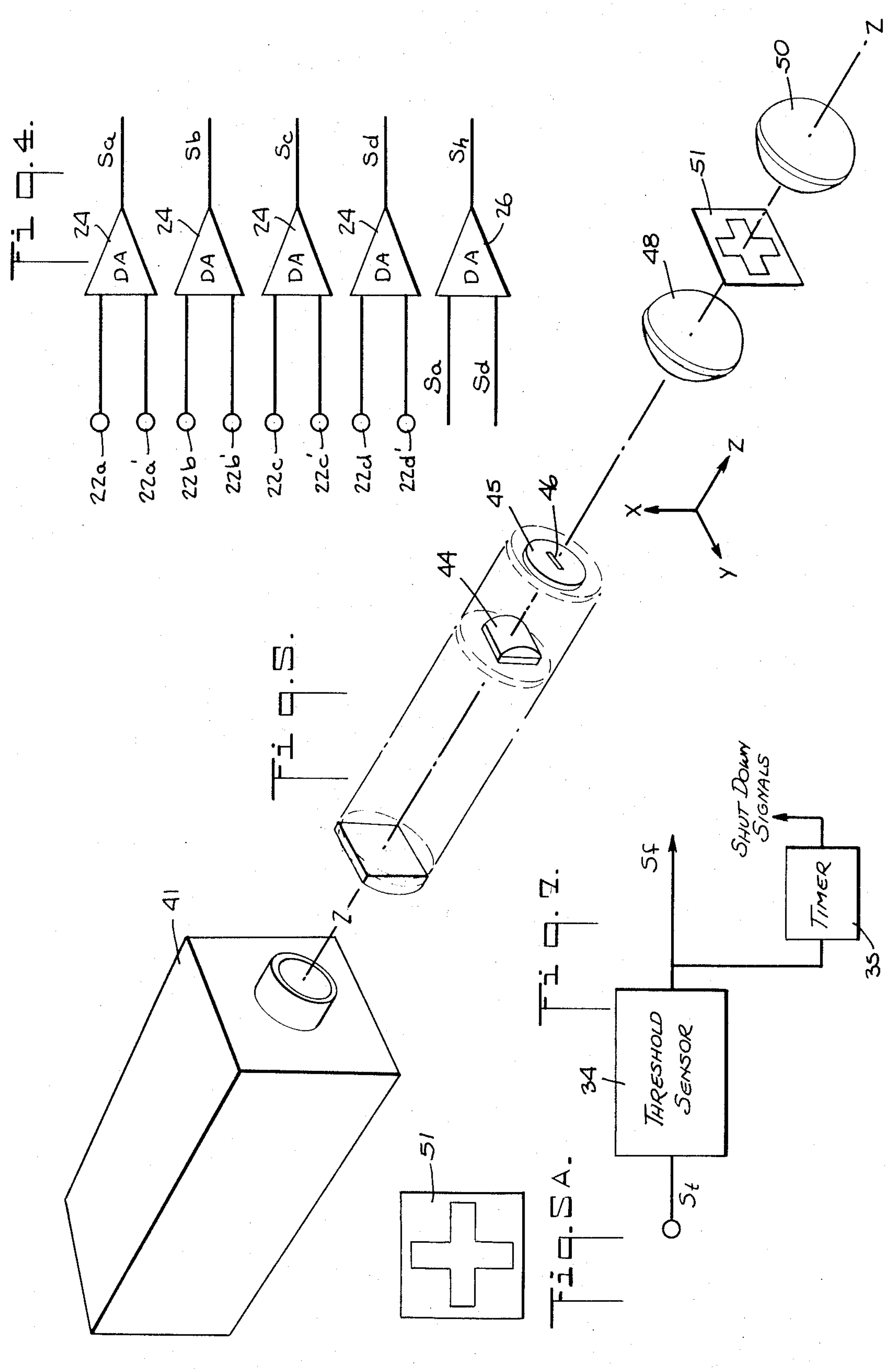
FIG. 4 is a block diagram representation of the photocell output comparator technique employed in reading the Fraunhofer diffraction pattern imaged at the plane of the photocells.
FIG. 5 is an optical schematic of the beam forming technique for forming a rectangular collimated laser reading beam.
FIG. 5*a* is a face view of a spatial filter.
FIG. 7 is a block diagram illustrating a technique for determining film break, lack of film, etc.

As illustrated in FIG. 4, the output of each pair of photocells is fed to a separate high gain differential amplifier 24. Because the two photocells 22 whose outputs are being compared by a single differential amplifier 24 are at an equal radial distance from the optical axis, the magnitude of the output from these two photocells will be identical when there is no code character in the light beam 16. The granular properties of the film will diffract the beam and cause a fourier diffraction pattern to be focused at the plane of the array 20. This particular fourier diffraction pattern has the important characteristic that its intensity is radially symmetric about the optical axis X—X. This unwanted signal, or noise, is effectively cancelled by the use of paired radially symmetrically placed photocells and a differential amplifier 24. When a character conveying information is entirely in the beam 16, then the fourier diffraction pattern of light on the array 20 is a pattern distinctly and uniquely associated with that particular character. Depending upon the fourier diffraction pattern generated, and thus on the character involved, certain of the pairs of photocells 22 will provide a differential output.

For example, with reference to FIG. 4, a given character may generate a fourier light pattern which will provide greater light intensity on the photocell 22$a$ than on the photocell 22$a'$. In that case, the differential amplifier 24$a$ will provide a high state signal $S_a$; that is, a signal having an above-ground voltage level.

That same character might provide a fourier diffraction pattern that would either fail to illuminate the two photocells 22$b$, 22$b'$ or, provide equal illumination for these two photocells. In such a case the differential amplifier 24$b$ will provide no output or what could be considered a ground state signal (that is, $S_b = 0$).

That same character might generate a fourier diffraction pattern that would provide a lower level of illumination on the photocell 22$c$ than is provided on the photocell 22$c'$. As a consequence, the differential amplifier 24$c$ would provide a low state signal $S_c$; that is, a signal at a level lower than ground.

Further, and just for purposes of example, the fourth pair of photocells might receive no illumination and thus provide a fourth signal $S_d$ of zero value or ground state.

Of course, it is true that on top of the information signal there is a noise signal. But, as described above, the radially symmetrical deployment of the paired photocells results in the substantial cancellatior of this noise signal. One important aspect of this cancellation of the noise signal is that as the graininess of the film 11 varies over the length of the film, this cancellation technique eliminates the noise. This particular cancellation technique thus not only eliminates noise problems but makes it unnecessary to have a completely uniform filmstrip.

The pattern of differential amplifier 24 output signals $S_a$, $S_b$, $S_c$ and $S_d$ provides a unique identification for most of the characters involved. Since each signal has three possible states (a high state, a zero state and a low state) and there are four signals, there are 81 possible permutations. Although the number of permutations is greater than the forty to forty-five characters normally employed, there are certain characters which will provide an ambiguous output if all that is looked at are the three states of these four outputs in various combinations. There is however, an additional characteristic of the information involved that can be looked at to resolve the few ambiguity situations that arise. That information is the magnitude of the high gain differential amplifier output signals $S_a - S_d$. Thus, as shown in FIG. 4, one or more low gain differential amplifiers 26 can be employed having as their inputs, pairs of the high gain differential amplifier 24 output signals. In the example shown one differential amplifier 26 has as its input the two signals $S_a$ and $S_d$. If the pattern that provides ambiguity is, for example, one in which $S_a$ and $S_d$ are both high state signals, then the low gain differential amplifier 26 can compare the magnitude of those two signals to provide a further state signal $S_e$ which would be either high state, zero state or low state. In this fashion a completely unique pattern of state signals can be provided to identify each character.

READING ON THE FLY (FIG. 6)

As the film moves past the rectangular beam, each character will proceed from a point where it just enters the beam, to a point where the character is entirely within the beam and then to a point where it leaves the beam. When the character is not entirely within the beam, the output reading signals $S_a$ through $S_h$ cannot be accurately read to decode the character. The character has to be entirely within the beam to assure that the existence and relative value of the decoding signals $S_a - S_h$ will correspond to the character being read. Only when the character is entirely within the beam will the correct stabilized (see below) Fraunhofer diffraction pattern be generated.

Figure 6:
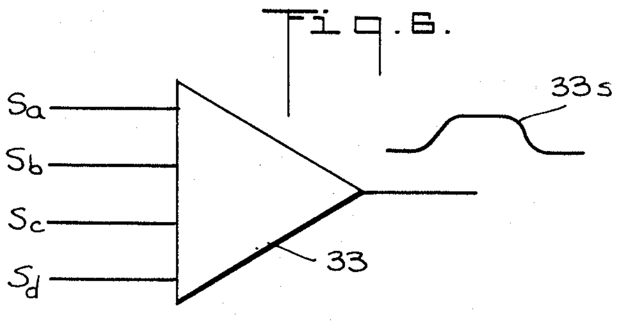
FIG. 6 is a block diagram illustrating the technique of determining when a character is within the reading beam.

The technique for determining when to read the signals $S_a$ through $S_h$ is shown in FIG. 6. Four or more of the signals $S_a$ through $S_h$ are fed in as additive inputs to an additive amplifier 33. While a character is moving across an edge of the beam, the output of amplifier 33 will vary. Once a character is entirely within the reading beam, the output of amplifier 33 will be nonvarying.

For a given character passing across the beam, the output 33s from the amplifier 33 might be as shown near the output line in FIG. 6. When the character being read is entirely within the beam, then the change in the value of the amplifier outpupt signal 33s decreases to a certain point (that is, the output from the amplifier 33 flattens out on top). At that point, the outputs $S_a$ through $S_h$ of the amplifier 24, 26 array are read. A differentiating network (not shown) can be used to continuously monitor the output of the amplifier 33. When the differentiating network output goes to zero, then the logic network that reads the Signals $S_a - S_h$ is gated on and the character in the window is read.

One of the most important consequences of the stabilization discussed above in connection with interrogating the code is that it makes it possible to have a reading window. The result is that while the film is in continuous motion across the beam, there is a period of time during which a character is wholly within the beam. During that period of time, the intensity of each spot of the diffraction pattern on the array is unvarying. Thus a signal, such as the signal 33$s$ can be developed to indicate when a reading is to be taken.

OUT OF EMULSION RESPONSE (FIG. 7)

The pages or documents laid out along the roll of film will normally be separated from one another by a clear transparent strip of film having neither document information thereon, nor coding information in the margin. This strip has no emulsion developed and can be used for splicing and updating. It has to be identified and located for such purposes.

In addition, the logic and structure of the system require an indication of the presence of the out of emulsion clear transparent areas in order to prevent false readings.

The output of the center photocell 22$e$ can be used for this identifying function.

The Fraunhofer diffraction pattern generated by the symbols 12, includes an undiffracted component. The intensity of this undiffracted component of the light transmitted by the characters is substantially below the intensity of light that is focused on this photocell 22$e$ when a clear area of film 11 intercepts the beam. Thus, a threshold can be established for determining when a clear area of film is presented to the laser beam. When the portion of the film having a document and thus coded in the margin is presented to the reading beam, the magnitude of the output $S_t$ of the center photocell 22$e$ is well below this threshold. When the clear area is presented, the center photocell output $S_t$ goes well above the threshold. A threshold sensor circuit 34 (see FIG. 7) responsive to a signal above this predetermined threshold can provide function signal $S_f$ indicating that a clear area is presented to the beam. The function signal $S_f$ prevents the logic from misreading. It can also be employed to bring the guide motor to stop at this clear area or do whatever other operation is desired.

One function that can be performed by this circuit 34 responsive to the out of emulsion threshold is to provide a shut-down signal to stop the motors from turning and stop the operation of the system whenever the duration of the out of emulsion signal exceeds a predetermined time period established by timer 35. This provides a safety factor when a cassette is presented without tape or when the tape is broken or when the tape is not being threaded through. If the out of emulsion signal $S_f$ exceeds the period of time that it takes to traverse the out of emulsion distance between frames, then this shut-down signal will be initiated.

In general terms, the logic of the system is such that an input from the reading mechanism is always required in order to provide a continuous comparison with the demand information. When in the out of the emulsion area between frames, an appropriate signal has to be provided so that the logic will respond properly by continuing to fail to initiate an indication that the desired document has been found. The use of the out of emulsion, relatively high level threshold operating off the center cell 22*e* has been found to be a preferred mode of providing this out of emulsion indicator information.

PREFERRED CODING ARRANGEMENT (FIG. 9)

FIG. 9 shows a greatly enlarged portion 28 of a reel of film containing a dictionary. Three words, in sequence, are shown; specifically, the words "abode", "abolish" and "abolition." Each word and its associated definition can be considered to be within a frame. The start of each frame is indicated by arrow 29 pointing to the left, said arrow having a cross mark. The end of each frame is indicated by an arrow 30 pointing to the right. Both the right and left margins of each frame are used to encode information. The reaons for this are in part to obtain a greater coding density and perhaps more importantly to provide a means, described later, for determining the direction of film movement and thus permitting control over film movement. The line 31 shown as a vertical line in FIG. 9, at the center of each frame is a rectangular center symbol. For reasons to be described more completely below, employing the center symbol 31 in both margins permits a very accurate centering technique.

A very important feature illustrated in FIG. 9 is the replication of the code symbols employed. In the embodiment shown, each code symbol is shown in triplicate so that there are three indentical lines of code symbols in each margin. The purpose of this code replication is to provide improved signal to noise ratio and to reduce problems that might arise if a given code character is partly or wholly obscured by, for example, a speck of dirt.

Since both margins contain coded information, two reading beams (as discussed in connection with FIG. 8) must be employed.

In order to reach each character, the reading beam in each margin must encompass only that character. To achieve this result, the reading beam employed for the FIG. 9 arrangement is a rectangular reading beam having the aspect of a slit. The reading beam in one embodiment has the dimensions of 30 mils (0.030 inches) by 2.2 mils. How such a beam is developed is described below in connection with FIG. 5.

In any case, assuming such a rectangular reading beam, when one of the symbols in the margin is wholly within the beam and is centered within the beam so that no adjacent symbol is within the beam, then, because the symbol is replicated, the beam is diffracted in an identical fashion at three places. The set of diverging rays generated by each of the three identical symbols have identical angular patterns. Thus, the focusing lens (such as at lens 18 in FIG. 2) will project the Fraunhofer diffraction pattern for each of the three identical symbols on top of one another at the array of photocells 22. If incoherent light were employed the result would be a three-fold increase in light intensity at the focal plane. But because coherent light is used, the effect of constructive interference is to provide a ninefold increase in light intensity at certain loci on the array. The result may be a distortion of the light intensity distribution of the normal Fraunhofer diffraction pattern. But the result is a unique diffraction pattern with greatly enhanced signal to noise characteristics. Additional identical code lines in each margin will increase the diffraction pattern intensity to an even greater extent and it is preferred to include as many lines of replicated coding as possible.

As shown in FIG. 9, the symbols used to encode the words defined in the dictionary are recognizable letters and spell out the word involved. The forward direction of the film strip 28 is downward in FIG. 9. The code letters used to spell out each word are distributed between both margins. Thus, with reference to the word above, the A on the left margin and the B on the right margin are both above the left pointing start of frame arrows 29. The sytlized 0 is above the A in the left margin and the D is above the B in the right margin. Then the center symbols 31 appear. The last letter E of abode is above the center symbol 30 in the left margin. The delta symbol 32 indicates a space carrying no information. Finally, completing the frame, are the right pointing end of frame arrows 30 in both margins.

As will be described in connection with FIG. 8, a first reading beam is employed to read the symbols in the left margin and a second reading beam is employed to read the symbols in the right margin. These two reading beams provide separate diffraction patterns which are converted to separate sets of electrical signals in separate photocell arrays.

In the embodiment represented by the film strip 28, the character dimension along the length of the film strip (that is, the width of the letters 33 shown) is about 1.5 mils (0.0015 inches). The cycle, or distance from leading edge of one symbol to leading edge of the next symbol, is 3.1 mils. The height of each symbol shown (that is, distance across the film 28) is 3.0 mils and the distance between lines of characters is about 2.0 mils. Obviously, this is just one embodiment and where required, greater packing densities can be used.

The reading beam (described more fully in connection with FIG. 5) for this FIG. 9 embodimentis preferably about 2.2 mils along the length of the film 28 and at least about 15 mils across the film. In fact a 2.2 mil by 30 mil rectangular beam is generated and used so that additional duplicate lines of coding characters can be used. A 2.2 mil reading beam means that there is a reasonable time period when the 1.5 mil wide symbol is entirely within the reading beam and when there is no other symbol within the reading beam, there being a 3.1 mil distance between cycles.

In connection with this replicated symbol technique, it should be kept in mind that the intensity of the light on a surface, as measured in foot-candles, is a function of the square of the electric field amplitude of the electromagnetic field. As a consequence, employing three identical symbols instead of a single symbol provides a tripling of the electromagnetic field transmitted through the margin. But, when focused in superimposed fashion on the array of photocells 22, the result is a nine-fold increase, at certain loci of constructive interference, in the light intensity. Similarly, a five-fold replication of the code results in a 25 - fold increase of light intensity at certain loci at the photocells 22.

This replication of the code symbols provides even further advantages. One of these advantages is in the cancellation of optical noise. It is believed that this noise cancellation derives from the coherence parameter of the laser reading beam. Apparently, because of the coherence that provides the Fraunhofer diffraction pattern, there is cancellation as well as reinforcement at certain spatial positions. It seems that the greater the magnitude of the spatially coherent diffraction pattern signal the more effective it will be to cancel out the randomly distributed optical noise.

This cancellation of noise phenomenon is so pronounced that the triple symbol when read by means of the window described herein (see FIG. 5) will cancel out the diffraction pattern of the slit on the array. Specifically, when the window is not reading a character, the diffraction pattern of the slit 46 (see FIG. 5) that creates the rectangular reading window 58*l*, 58*v* (see FIG. 8) can be readily observed on the photocell 22 array. When the window reads a single symbol, the diffraction pattern of the slit 46 can also be observed. But when the window reads a symbol in triplicate, the diffraction pattern of the slit 46 cannot be observed on the array.

It is not entirely clear as to why this phenomenon occurs. It seems closely related to the coherence parameter. In any case, it is an enormously valuable aspect of the design of this invention and it is the replicated code symbol design that provides this cancellation of noise phenomenon.

BEAM FORMING (FIG. 5)

As indicated above in connection with a discussion of FIG. 9, the reading beam that impinges on the margin of the film 28 must be shaped and be dimensioned such that each replicated symbol can be read for a period of time while the film 28 is moving and while no other symbol is within the beam. To perform this function, in the embodiment described herein, the optical arrangement shown in FIG. 5 forms a rectangular beam having the dimensions 2.2 mils by 30 mils. In a sense, the cross section of this beam can be considered a window and may be referred to as such herein. When the symbol is entirely within the window, then the technique described in connection with the description of FIG. 6 provides an indication that such is the case and the Fraunhofer diffraction pattern is read, thereby reading the symbol.

FIG. 5 shows a means for developing this rectangular beam from a circular beam of laser light 40 mils in diameter and for doing so in a fashion that minimizes the amount of light lost in the process of forming the beam. As indicated in FIG. 9, both margins of the film strip 28 are employed. The single rectangular light beam formed in FIG. 5 is then split by a beam splitter technique, as shown in FIG. 8, so that two separate identically dimensioned rectangular laser light beams are made available for the simultaneous reading of both margins.

With specific reference to FIG. 5, a standard laser generator 41 provides a standard 40 mil (0.040 inch) diameter circular laser beam. The optical axis Z—Z of this beam is indicated in FIG. 5 to be a Z axis. Along the X axis, in FIG. 5, this 40 mil light beam is compressed by virtue of the first cylindrical lens 42. A second cylindrical lens 44 serves to recollimate the beam in the Y axis. Because the two cylindrical lenses 42, 44 have their curvature only in the X axis (they are not spherical lenses), they affect only the X dimension of the light beam.

By properly selecting the relative focal lengths of the two cylindrical lenses 42, 44, a collimated eliptical beam of laser light is projected onto the plate 45 and through the rectangular slit 46. The eliptical beam of light has a major axis of 40 mils and a minor axis of 3.3 mils while the slit 46 is 30 mils along the Y axis and 2.2 mils along the X axis, exactly the dimensions of the beam of light transmitted onto the symbols in the margin of the film 28 and used as the reading window.

To obtain this reduction of the dimension of the beam of light in the X axis from 40 mils to 3.3 mils, the ratio of the focal distance of the lens 42 to the focal distance of the lens 44 is the ratio of 40 to 3.3. In one embodiment, 40 millimeter and 3.3 millimeter focal length lenses were used. In order to provide a collimated output from the second lens 44, the two lenses 42 and 44 are positioned relative to each other so that the downstream focal plane of the lens 42 is coincident with the upstream focal plane of lens 44.

The two spherical converging lenses 48 and 50 serve to process and transmit the light passing through the slit 46 and reform that of light as a reading window 58 on the plane of the film 28.

The eliptical collimated beam impinging on the upstream side of the plate 45 will be diffracted by the slit 46. Because of this diffraction, there will be significant divergence of the beam downstream from the slit 46. However, the positioning of the slit 46, the lenses 48, 50 and the film 28 is such that: (a) the slit 46 is at the upstream focal point of the lens 48, (b) the downstream focal plane of the lens 48 and upstream focal plane of the lens 50 are coincident, and (c) the film 28 is in the plane of the downstream focal plane of the lens 50.

Accordingly, the light that fills the slit 46 will be reformed at the film. The result provided by this technique is equivalent to the result that would occur if an actual mechanical slit of the same dimensions as the slit 46 were positioned in the plane of the film at the code symbol S and illuminated by a collimated laser light beam. Thus this FIG. 5 technique assures that the reading window 58 will have exactly the desired dimensions and that no light will impinge on the film 28 except at the window.

It may help to understand what happens by recognizing that the lenses 48 and 50 perform an optical operation which in mathematical terms can be described as taking the fourier transform of the electric field distribution of the light at the upstream focal plane of each lens. For the lens 48, the electric field distribution, in its upstream focal plane is rectangularly cut off by the edges of the slit 46. The result, which optically speaking is substantially a Fraunhofer diffraction pattern, appears at the downstream focal plane of each lens.

Explicitly, the lens 48 performs the operation of taking the non-observable fourier transform of the electric field components of the light distribution at the slit 46 and transmits that transform into an observable form at the downstream focal plane of the lens 48. This means that the Fraunhofer diffraction pattern of the slit 46 appears at the back focal plane of the lens 48.

Further, the lens 50 performs the operation of taking the non-observable fourier transform of the electric field components of the light distribution at its front focal plane and creates that transform as an observable form at the downstream focal plane of the lens 50. This means that the slit is effectively re-formed at the film 28 because the fourier transform of the fourier transform is the object itself (through with inverted coordinates).

This FIG. 5 system broadly speaking, projects the slit 46 onto the plane of the film 28. More accurately speaking, this FIG. 5 system reproduces at the plane of the film 28, the light that appears within the slit 46. More specifically, this light is reproduced in that the light at the window 58 has (a) the same geometrical configuration as the light in the slit 46, (b) the same light intensity distribution as does the light in the slit 46 and (c) the same electric field as does the light in the slit 46. Thus, the light at the window can be considered as the equivalent of the light that would be provided if a plane collimated beam of laser light were impining on a mechanical slit placed over the symbols being read.

Among the reasons for the use of this optically formed window rather than an actual mechanical slit at the film are: (a) this arrangement provides a much easier and more accurate mode for adjusting the exact position of the optical window, (b) there would be serious dimensional problems in positioning the cylindrical lens 44 immediately behind the plane of the film since, for example, the focal distance of one lens 44 that has been employed is only 3.3 millimeters, and (c) the system shown makes it possible to generate and develop the rectangular reading beam before it is split, by the beam splitter 56, into the two required reading beams.

It is important that the spherical lenses 48, 50 be diffraction limited high quality lenses and have as large a diameter as possible. In one embodiment where the dominant mode of the laser beam has a wave length of 6,328 Angstroms, both of the lenses 48, 50 are diffraction limited lenses with a speed of F/8 and a 100 millimeter focal length. The importance in the quality and speed of these two lenses 43, 50 arises out of the fact that they must reproduce the light from the slit 46 as accurately as possible at the window 58 on the film 28. Accurate window dimensions and a sharp roll-off from the intensity of light within the window to the intensity outside the window are both of great importance. To obtain these results, high quality fast spherical lenses 48, 50 are employed. The other lenses employed in this system need not be of as high a quality because the functions they perform are not as critically dimensionally limited.

In order to obtain a reading window that is a reproduction of the light at the slit 46, what is required structurally is that: (a) the slit 46 be at the front focal plane of the lens 48, and (b) the back focal point of the lens 48 and the front focal point of the lens be coincident. Axial displacement (that is, displacement along the optical axis Z—Z) of the aperture 46, lens 48 and/or the lens 50 will mean a change in reading window dimensions and a loss of the even light intensity profile across the window. The result would then be an increase in cross talk (interference) from adjacent symbols and a decrease in the signal level of the diffraction pattern of the array of photocells.

More than the intensity distribution and the dimension of reading window are involved. The phase of the electric field of the light beam at the reading window is of critical importance. The lens 48, like the lens 18 in FIG. 2, will generate the Fraunhofer diffraction pattern of the slit 46 at the downstream (back) focal plane of the lens 48. If only the light intensity characteristics of the pattern are or concern, then it is not important that the slit 46 be at the upstream (front) focal point of the lens 48. Thus, in FIG. 2, this latter positioning is not discussed nor is it important. The photocelis 22 respond to intensity and provide electrical signals which are compared and interpreted as described elsewhere herein. The intensity, in foot-candles, of the light at any point is a product of the expression for the electrical field at that point, multiplied by the conjugate expression for the electrical field of the light at that point. Thus, the phase components of the electrical field expression cancel out. In effect, intensity is equal to the square of the absolute value of the electric field at a point. But it must be remembered that the purpose of the lenses 48 and 50 is to create a collimated light beam for reading the code on the film to create the collimation, the phase components of the electrical field of the light beam must be taken into account and thus the above-stated relationships between slit 46 and lenses 48 and 50 must be provided. Processing of the equations 4–13 on page 61 of the Goodman text will show why this is so. Briefly, it boils down to the fact that taking the fourier transform of a fourier transform means taking a transform of an expression having phase terms. In order to end up with the original expression, the phase terms must drop out. Optically, this can be done by not deviating from the focal plane requirements for slit 46 and lenses 48 and 50 set forth above.

A four quadrant spatial filter 51 at the back focal plane of the lens 48 filters out scattered light in each quadrant. The Fraunhofer diffraction pattern of a rectangular slit 46 is substantially a series of spots of light distributed along the axes of a cross. The spatial filter 51, as shown in FIG. 5*a*, provides four opaque corners to transmit the Fraunhofer cross diffraction pattern through the central cross-like opening and to block undesired scattered light. This undesired light can occur because the lens 44 is very small and its surface tends to be slightly irregular, thereby serving to scatter some light. If the optical and mechanical axes of the cylindrical lenses 42, 44 are not identical, alignment may be off and the light incident on the lens 44 will depart slightly from perpendicular. The result will be some light scattering. In one embodiment, with the filter 51 removed, the window at the plane of the film had a halo around it. The halo intensity was between 24 and 30 db down from the light intensity at the window. The result was a small amount of cross-coupling between adjacent characters. With the filter 51 in place, the halo could not be seen and cross-coupling was nil.

BEAM SPLITTING, DIRECTIONAL CONTROL OF FILM AND BEAM STEERING MECHANISM (FIG. 8)

FIG. 8 illustrates the processing of the beam downstream from the lens 50 of FIG. 5. The light beam is projected downstream from the lens 50 (see FIG. 5) by way of first and second steering mirrors 52, 54. The purpose of these steering mirrors is described in greater detail immediately below but, in general, it is to position the reading beam at the film 28. The beam is then intercepted at the face of a beam splitter 56 which causes the beam to be split in two, half the strength of the beam being projected immediately downward to form a first reading beam window 58R on the right margin of the film 28. The other half of the strength of the beam passes through the beam splitter 56 to a mirror 60 to be directed onto the left margin of the film 28 thereby forming a second reading window 58L at the left margin of the film 28. In this fashion, two reading beams are formed. The first beam then passes through a first converging lens 62 while the second beam passes through a second converging lens 63. These lenses 62, 63, are standard lenses, and like the lens 18 in the FIG. 2 embodiment provide Fraunhofer diffraction pattern imaging at their back focal plane. A magnifier lens 64 serves to project a focused and magnified image of the Fraunhofer diffraction pattern of each of the symbols being read onto two separate halves of a reading screen 66.

Because of the use of the lenses 62, 63 the center of each Fraunhofer diffraction pattern is always at the same point on the screen 66. Because in FIG. 8, there are two diffraction patterns, there are two center points. It is these center points which represent the undeflected component of the diffracted light being projected.

As the film 28 is transported past the two reading windows, a character will move into each rectangular beam until it is entirely within the beam and then will disappear out the other side of the beam. As a consequence, as described in connection with FIG. 6, the signal 33*s* is generated. The result in the dual beam FIG. 8 embodiment will be a repetitive varying signal associated with each half of the reading screen 66. The two reading windows 58L, 58R, are displaced along the length of the film 28 sufficiently so that when a character is centered in one of the two beams, the other beam will be one-quarter the way between two characters. As a consequence, the output signals 33*s* from the two additive amplifiers 33 will have a 90° phase displacement. When the film is being driven in a forward direction, the amplifier 33 signal 33*s* derived from a first one of the beams will lead the amplifier 33 signal 33*s* derived from a second one of the beams. By contrast, when the film is being run backward, the signal derived from the second one of the beams will lead the signal derived from the first one of the beams. Accordingly, a fairly simple standard forward-backward logic technique can be employed to determine which way the film is running.

In turn, this makes it possible, once a desired document has been located, to back up to the center of the document, or move forward to the center of the document (as the case may be) so that the document and the corresponding piece of microfilm is appropriately positioned for optical viewing or reproduction.

This ability to sense direction of film movement also makes possible a rapid and sensitive positioning of the frame for projection for reproduction.

A vignetter 68 downstream from the lens 64 prevents the two Fraunhofer diffraction patterns from overlapping on the photocells 22.

A further advantage of this FIG. 8 arrangement is that it permits use of both margins of the film and thus makes it possible to double the coding density over the FIG. 2 embodiment.

An alternate, and at present less preferred, way of sensing the direction in which the film is traveling, and thus providing forward-backward control, is to provide two clock tracks along the margin of the film. These clock tracks are quite independent of the alphanumeric symbols that code substantive information. Each clock track could, for example, be a line of alternating opaque and transparent rectangles having a 50 percent duty cycle. The two tracks would be 90° out of phase with one another so that a first light beam to a first track produces a signal that is 90° displaced from the signal produced by a second light beam to the second track.

It might be noted that the distance the reading beam travels from the second spherical lens 50 to the right margin of the film 28 is slightly less than the distance the beam travels to the left margin of the film 28. Thus the reading window 58R and the reading window 58L cannot both be at precisely the downstream focal plane of the spherical lens 50.

In one embodiment, the window 58R is optically at the focal distance from the lens 50. This meant that the window 58L is approximately ten percent further downstream optically. The result is that the width of the window 58L is about 10 percent greater than the width of the window 58R. There was no perceivable difference in the effective operation of these two windows since both windows were large enough to bracket the symbol being read for a long enough transit time of the symbol to generate the reading signal. Yet these windows were narrow enough to permit such transit of the symbol being read within the window for an appreciate period of time without overlapping onto adjacent symbols. In that embodiment, the focal distance of the lens 50 is 100 millimeters (approximately four inches) and the width of the film 28 is 16 millimeters. The center distance between right and left code tracks is about 0.4 inches. This 10 percent greater distance from lens 50 to left window 58L means approximately a ten percent greater window size.

Two steering mirrors 52, 54 are attached to supports 70 and 72, respectively, and position the light beam at the beam splitting prism 56. Each of these steering mirrors 52, 54 rotate about one axis and is movable in one direction as indicated by the arrows in FIG. 8. As a consequence, these mirrors can be used not only to position the beam so that it hits the beam splitter 56 at a desired position but also to make sure that the beam hits the beam splitter at the desired angle. By slightly angling the light incident on the beam splitter 56 it is possible to displace the two output light beams in the direction of film movement and thus obtain a 90° phase relationship between the left and right margin character readings.

The use of both rotational and displacement beam steering adjustments to position the windows 58L and 58R makes it convenient to make window adjustments and keep within the narrow confines of the beam splitter 56.

In FIG. 5, the two lenses 42, 44 and the plate 45, which serve to form the basic rectangular beam, are shown as linked together mechanically. These three elements 42, 44, 45 can be rotated about the optical axis Z—Z as a unit and thus make sure that the rectangular reading windows 58 are properly squared off relative to the symbols being read.

The beam splitter could be placed between the slit 46 and the first spherical lens 48 so as to form two separate beams which would be separately processed by duplicate spherical lenses 48, 50. This approach is less preferred because it requires two additional relatively expensive diffraction limited, high speed lenses. But such an approach may be desirable at some high code symbol packing density where the approximation in dimensions between the two windows 58R, 58L might not be desirable.

As an alternative, and at present less preferred, embodiment, the beam splitting function could be performed between the slit 46 and the first spherical lens 48. Such an embodiment would require a second set of spherical lenses 48, 50 and because these are expensive diffraction limited, high speed lenses, it is desirable to avoid them doing such. However, it should be understood herein that the invention emcompasses this alternate embodiment.

POSITIONING AT THE CENTER OF THE FRAME (FIGS. 8 AND 9)

To position the frame to be viewed, the forward-backward control discussed in connection with FIG. 8 is required. Assume the frame is scanned and identification is made that the frame is the one, or one of the ones, commanded by the input to the keyboard. Upon such identification, the reel of film is moved either forward or backward until the center of the frame is positioned within the reading beam.

A special symbol is used in the margin at the center of each frame to indicate the center of each frame. The symbol used is, as indicated at FIG. 9, a rectangle 31 in line with the rest of the symbols.

The output from a first additive amplifier 33 in response to the center symbol 31 in the right margin is a signal 75 shown in FIG. 10. Similarly, the signal 76 is the output from a second additive amplifier 33 due to the center rectangular symbol 31 on the left margin. The logic of the system is set up in such a fashion as to locate on the intersection point 77 of the two signals 75, 76. It is this intersection point 77 which precisely locates the center of the frame involved.

Because of the fact that the center symbol 31, like the rest of the symbols, has a 50 percent duty cycle, and because of the fact that the two center symbols 31 on the two tracks are interrogated to provide orthogonal additive amplifier outputs and further because of the fact that the width of the windows 58R, 58L cover 75 percent of the cycle from the beginning of one character to the beginning of the next character, it follows that adjacent code symbols would interfere with the signal pattern shown in FIG. 10. Thus, increased spacing is employed between the center code symbol 31 and the immediate preceeding and succeeding code symbols. The simplest way of doing this it to omit the preceeding and succeeding code symbols, and achieve the relative spacing suggested in FIG. 10.

In addition, as each frame is scanned, this center character 31 provides an indication of whether or not the frame is more than one-half way past the reading head. This latter indication, together with the information concerning direction of film travel makes possible the control necessary to run the film either backward or forward once a desired frame has been identified.

THE FRAUNHOFER DIFFRACTION PATTERN

Reference is made herein to the creation of a Fraunhofer diffraction pattern. It should be understood that the actual diffraction pattern formed may not correspond to the formal definition of the Fraunhofer diffraction pattern. Rigorously speaking, the Fraunhofer diffraction pattern must satisfy the equation (4–13) on page 61 of the Goodman test referenced above.

However, the requirements of the system do not demand a diffraction pattern that fully meets Fraunhofer definitions. For example, the diffraction pattern at the array of photocells is employed for its light intensity distribution characteristic. Thus the fact that its electric phase characteristic meets the Fraunhofer definition is not a requirement for proper photocell response. Even as to light intensity, the replication of the symbols results in an interference product at the array that modifies the Fraunhofer light intensity distribution for a single symbol.

It should be understood herein that the reference to Fraunhofer diffraction pattern refers to the type of diffraction pattern involved in the embodiment disclosed. What is required is a unique and reproducible diffraction pattern for each character.

SPATIALLY COHERENT LIGHT

The type of light required in this invention is known in the art as spatially coherent light. A comprehensive definition of spatially coherent light is quite technical but since it is known in the art, there is no need to provide a comprehensive definition here. A brief discussion of spatially coherent light appears at pages 106–107 of the Goodman text.

In simple terms, spatially coherent light can be considered to be light that appears as if it was generated by a point source. If a conical segment of the light emitted from the point source is collimated, it is obvious that the phase relationship between points on any wave front (that is, cross-section through the collimated beam of light) will be the same at all positions of the wave front along the optical axis. This will be true even if the light emitted from the point source is not monochromatic. This will also be true if the frequency of the light emitted from the point source varies with time. As mentioned in the Goodman text, coherent illumination can be obtained under conditions where the light obviously could not have originated from a point source. But the most usual examples of a source of spatially coherent light are ones that provide a light beam that does indeed appear as if it originated at a single point. The laser is the most popular such source. A zirconium arc lamp can yield spatially coherent light if the output is passed through a pinhole. The advantage of a laser over other point sources is that a laser provides much greater light intensity, has a much longer life and requires very much less power for a given amount of light output.

In one embodiment a helium neon laser was employed and appears to be a preferred laser. In such an embodiment, the non-dominant modes were appreciably reduced by virtue of the spatial filtering effects provided by the slit 46 and by the spatial filter 51. This spatial filtering is enhanced because of the operation of the cylindrical lens 42 and 44. The dominant mode of the laser beam is recollimated by the lens 44 with less scattering than are the other undesirable and unwanted high frequency modes. In any case, the slit 46 and filter 51 serve to filter out much of these non-dominant modes and thus clean up the laser beam and provide a reading beam that is more spatially coherent than is the original laser beam.

It should be understood, that this invention will work with spatially coherent light that includes non-coherent components. The greater the spatial coherence, the smaller and more closely packed can be the symbols of the code.

A more complete and rigorous treatment of an definition of spatially coherent light may be found in *Theory of Partial Coherence* by M. J. Baran and G. B. Parrent, Jr., Prentice-Hall, Inc. Englewood Cliffs, N.J., 1964.

What is claimed is:

1. In an automatic document retrieval system for reading a film at a predetermined plane, the interrogating light beam generating apparatus comprising:

light source means to provide a beam of spatially coherent light circular in cross-section and having a first cross-sectional area, first and second cylindrical lenses optically downstream from said light source means to convert said circular light beam into a collimated eliptical light beam having a second cross-sectional area less than said first cross-sectional area, a plate having an opening of a desired reading window configuration at the back focal plane of the optically downstream one of said cylindrical lenses, first and second spherical lenses downstream from said plate to process and transmit the diffracted light beam from said opening, said opening being at the front focal plane of said first spherical lens, the back focal plane of said first spherical lens being substantially coincident with the front focal plane of said second spherical lens, the back focal point of said second lens being coincident with the predetermined plane of the film at which the information to be read is located, the sole image created at said predetermined plane being an image of the light transmitted through said opening in said plate.

2. The apparatus of claim 1 further comprising:

a spatial filter at the back focal plane of said first spherical lens to transmit the diffraction pattern of said opening of said plate and to block scattered light.

3. In an automatic document retrieval system, the improvement of a means to provide a beam of spatially coherent light for reading a film comprising:

a light source providing a collimated beam of light having a first cross-sectional area, first and second lenses optically downstream from said light source, said first and second lenses transforming and imaging said light beam into a collimated light beam having a predetermined cross-sectional shape and a second cross-sectional area less than said first cross-sectional area, said first and second lenses compressing said light beam in at least one axis, a plate having an opening of a desired reading window configuration at the back focal plane of the optically downstream one of said first and second lenses, said predetermined cross-sectional shape of said light beam incident on said opening providing substantially increased light transmission through said opening than would be provided if the light beam from said light source were incident on said opening without being shaped by said first and second lenses, a predetermined plane at which the film to be read is positioned, third and fourth lenses downstream from said plate and positioned to process and transmit the diffracted light beam from said opening to provide an exact replica of the light content of said opening in said plate at said predetermined plane, said third and fourth lenses being spherical, the back focal plane of said third spherical lens being substantially coincident with the front focal plane of said fourth spherical lens, said opening in said plate being substantially at the front focal plane of said third spherical lens, and the back focal point of said fourth lens being substantially coincident with said predetermined place of the film to be read, the sole image created at said predetermined plane being an image of the light transmitted through said opening in said plate.

4. The improvement of claims 3 wherein:

said light source provides a beam substantially circular in cross-section, said first and second lenses are cylindrical lenses and convert said circular light beam into an eliptical light beam, said opening at said plate is rectangular and has dimensions that fit within the cross-section of said eliptical light beam incident on said plate.

5. The improvement of claim 3 wherein the geometric shape of said opening of said plate encompasses the information to be read on the film.

6. The improvement of claim 3 further comprising:

a spatial filter substantially at the back focal plane of said third lens, the geometry of said spatial filter transmitting the diffraction pattern of said opening of said plate and blocking scattered light.

7. The improvement of claim 4 further comprising:

a spatial filter substantially at the back focal plane of said third lens, the geometry of said spatial filter transmitting the diffraction pattern of said opening of said plate and blocking scattered light.

8. The improvement of claim 5 further comprising:

a spatial filter substantially at the back focal plane of said third lens, the geometry of said spatial filter transmitting the diffraction pattern of said opening of said plate and blocking scattered light.

* * * * *